(12) United States Patent
Wu et al.

(10) Patent No.: US 9,117,448 B2
(45) Date of Patent: Aug. 25, 2015

(54) METHOD AND SYSTEM FOR SPEECH RECOGNITION USING SOCIAL NETWORKS

(75) Inventors: Sung Fong Solomon Wu, Sunnyvale, CA (US); Aaron Tong, San Jose, CA (US); Sam C. Lee, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1283 days.

(21) Appl. No.: 12/509,797

(22) Filed: Jul. 27, 2009

(65) Prior Publication Data

US 2011/0022388 A1 Jan. 27, 2011

(51) Int. Cl.
*G10L 15/00* (2013.01)
*G10L 17/22* (2013.01)
*G10L 15/20* (2006.01)

(52) U.S. Cl.
CPC ............... *G10L 17/22* (2013.01); *G10L 15/20* (2013.01); *G10L 15/00* (2013.01)

(58) Field of Classification Search
CPC .............................. G10L 17/005; G10L 17/02
USPC ........................................................ 704/246
See application file for complete search history.

(56) References Cited

U.S. PATENT DOCUMENTS

| | | | |
|---|---|---|---|
| 6,853,716 B1 | 2/2005 | Shaffer et al. | |
| 7,533,020 B2 * | 5/2009 | Arnold et al. | 704/257 |
| 7,672,833 B2 * | 3/2010 | Blume et al. | 704/10 |
| 7,685,201 B2 * | 3/2010 | Zeng et al. | 707/748 |
| 7,836,002 B2 * | 11/2010 | Macbeth et al. | 706/46 |
| 7,966,171 B2 * | 6/2011 | Gilbert et al. | 704/8 |
| 7,983,902 B2 * | 7/2011 | Wu et al. | 704/10 |
| 8,009,678 B2 * | 8/2011 | Brooke | 370/395.42 |
| 2007/0233497 A1 * | 10/2007 | Paek et al. | 704/270 |
| 2008/0215623 A1 * | 9/2008 | Ramer et al. | 707/104.1 |
| 2008/0319757 A1 * | 12/2008 | Da Palma et al. | 704/270.1 |
| 2009/0006085 A1 * | 1/2009 | Horvitz et al. | 704/223 |
| 2009/0018830 A1 * | 1/2009 | Emmanuel | 704/235 |
| 2009/0111441 A1 * | 4/2009 | Monaco et al. | 455/415 |
| 2009/0112600 A1 * | 4/2009 | Gilbert et al. | 704/270.1 |
| 2009/0138356 A1 * | 5/2009 | Pomplun | 705/14 |
| 2009/0157705 A1 * | 6/2009 | Nomiyama | 707/100 |
| 2009/0177744 A1 * | 7/2009 | Marlow et al. | 709/204 |
| 2009/0204392 A1 * | 8/2009 | Ishikawa | 704/10 |
| 2009/0228281 A1 * | 9/2009 | Singleton et al. | 704/275 |
| 2009/0248412 A1 * | 10/2009 | Washio | 704/246 |
| 2009/0281988 A1 * | 11/2009 | Yoo | 707/3 |
| 2010/0076968 A1 * | 3/2010 | Boyns et al. | 707/732 |
| 2010/0268830 A1 * | 10/2010 | McKee et al. | 709/228 |
| 2010/0312547 A1 * | 12/2010 | Van Os et al. | 704/9 |

(Continued)

OTHER PUBLICATIONS

Rowe. "Applying Semantic Social Graphs to Disambiguate Identity References" Jun. 4, 2009.*

(Continued)

*Primary Examiner* — Daniel Abebe (57) ABSTRACT

In an example embodiment, there is disclosed an apparatus comprising an audio interface configured to receive an audio signal, a data interface is configured to communicate with at least one social graph, and logic is coupled to the audio interface and the data interface. The logic is configured to identify a calling party. The logic is further configured to acquire data representative of a called party from the audio signal. The logic is configured to initiate a search of the at least one social graph for the data representative of the called party to identify the called party responsive to acquiring the data representative of the called party.

18 Claims, 6 Drawing Sheets

(56) References Cited

U.S. PATENT DOCUMENTS

| | | | |
|---|---|---|---|
| 2011/0004462 A1* | 1/2011 | Houghton et al. | 704/9 |
| 2011/0010180 A1* | 1/2011 | Agapi et al. | 704/275 |
| 2011/0015928 A1* | 1/2011 | Odell et al. | 704/257 |

OTHER PUBLICATIONS

Oh. "Social Network Analysis on Name Disambiguation and More" Nov. 2008.*

Minkov et al. "Contextual Search and Name Disambiguation in Email Using Graphs" 2006.*

Rowe et al. "Disambiguating Identity through Social Circles and Social Data" Jun. 5, 2008.*

Massachusetts Institute of Technology, "9.67 Object and Face Recognition", 2001.

Wikipedia, "Apha-beta pruning" Jun. 17, 2009.

Wikipedia, "Pruning (algorithm)", May 15, 2009.

iLocus, "Intelligent Phone Book", Mar. 29, 2008.

MIT Media Laboratory Vision and Modeling Group, "Face Recognition Demo Page", Jul. 25, 2002.

Stone et al., "Autotagging Facebook: Social Network Context Improves Photo Annotation", May 4, 2008.

Zilca, "Text-Independent Speaker Verification Using Utterance Level Scoring and Covariance Modeling", 2002.

* cited by examiner

METHOD AND SYSTEM FOR SPEECH RECOGNITION USING SOCIAL NETWORKS

TECHNICAL FIELD

The present disclosure relates generally to speech recognition and more particularly to speech recognition using social networks.

BACKGROUND

Directories and phonebooks enable users to conveniently locate names and contact information. However, as phonebooks and directories grow larger in size, locating names becomes more time consuming and less convenient. Voice recognition technology has been developed and widely used in the industry to allow users to access and retrieve names from a phonebook or directory more conveniently by speaking a name. The voice recognition technology translates the spoken name to text and uses the text to retrieve the name from the directory.

When audio quality in a voice network is poor, however, results returned by the voice recognition technology may be inaccurate or confusing. Additionally, the results may be inaccurate or confusing if a user has a heavy accent. Spoken relationships, as opposed to spoken names, may also produce inaccurate or confusing results.

BRIEF DESCRIPTION OF THE DRAWINGS

The accompanying drawings incorporated herein and forming a part of the specification illustrate the examples embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed an apparatus comprising an audio interface configured to receive an audio signal. A data interface is configured to communicate with at least one social graph associated with a calling party. Logic is coupled to the audio interface and the data interface. The logic is configured to identify the calling party. The logic is further configured to acquire data representative of a called party from the audio signal. The logic is further configured to search the at least one social graph associated with the calling party for the data representative of the called party to identify the called party responsive to acquiring the data representative of the called party.

In accordance with an example embodiment, there is disclosed herein, a method comprised of receiving an audio signal. A calling party is identified. Data representative of a called party is acquired from the audio signal. At least one social graph is searched for the data representative of the called party to identify the called party responsive to acquiring the data representative of the called party.

Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Social graph, or social network, analysis is used in an example embodiment disclosed herein in conjunction with a speech recognition system to improve accuracy, performance, and usability of a communication system. A social graph is a structure which defines the relationships of individuals with one another. A speech recognition system is used to search for names of individuals in a directory. Using a private or public social graph, the voice recognition system is able to determine a called party more accurately based on relationships of the calling party. For example, John is driving through an area with bad cell phone reception. He has a stomach ache and wants to call his doctor for advice. John only knows the 1-800 number to reach his doctor, Dr. Sheen. When John calls the 1-800 number, he is asked for the doctor's name with whom he wishes to speak. Due to bad reception, a voice recognition system can only interpret a portion of audio spoken by John. However, based on John's social graph which shows a relationship with Dr. Sheen, a communication system is able to interpolate that John wants to talk to Dr. Sheen and is therefore able to place a call to Dr. Sheen.

In another example, Mr. Ling has a heavy accent. When he places a call to his company and is connected to a phone directory, a voice recognition system is not able to accurately interpret his speech. However, if the voice recognition system is able to communicate with the company's social graph, the voice recognition system will use Mr. Ling's relationships with his peers, group, and others within the organization to identify the individual Mr. Ling intended to call. For example, if the voice recognition system partially recognizes the word "Jim," voice recognition system would place a call to Mr. Ling's boss, Jim Olsen. Searching for the name is also optimized since the search is based on the social graph rather then a linear search through the company directory.

In another example, Cindy wants to call her husband Vince. Instead of speaking her husbands name to a voice recognition system, Cindy speaks "call my husband." Using Cindy's social graph, a voice recognition system is able to determine that Cindy's husband is Vince and is therefore able to place a call to Vince. In addition, Cindy may speak the name "Vince." However, Cindy may have a husband named Vince and a good friend named Vince. Thus, the voice recognition system may use Cindy's social network to identify both parties. The voice recognition system would then suggest both parties to Cindy and allow Cindy to choose the party she intended to call. Although the voice recognition system was not able to determine the called party, the voice recognition system was able to narrow down a list of suggested individuals presented to Cindy without including individuals named Vince with whom Cindy has no relationships.

In another example, due to a poor voice network and Tommy's heavy accent, a voice recognition system is unable to extrapolate Tommy's speech when Tommy attempts to call his co-worker Jessica. However, based on Tommy's social network, the speech recognition system is able intelligently suggest names for Tommy to chose from.

In another example, Jay attempts to call his friend John Doe by speaking "John Doe" to a voice recognition system. However, because John Doe is a popular name, there are many John Does in a directory. By using Jay's social graph, the voice recognition system is able to narrow down the choices presented to Jay by limiting the results to only the John Does with whom Jay has a relationship.

Figure 1:
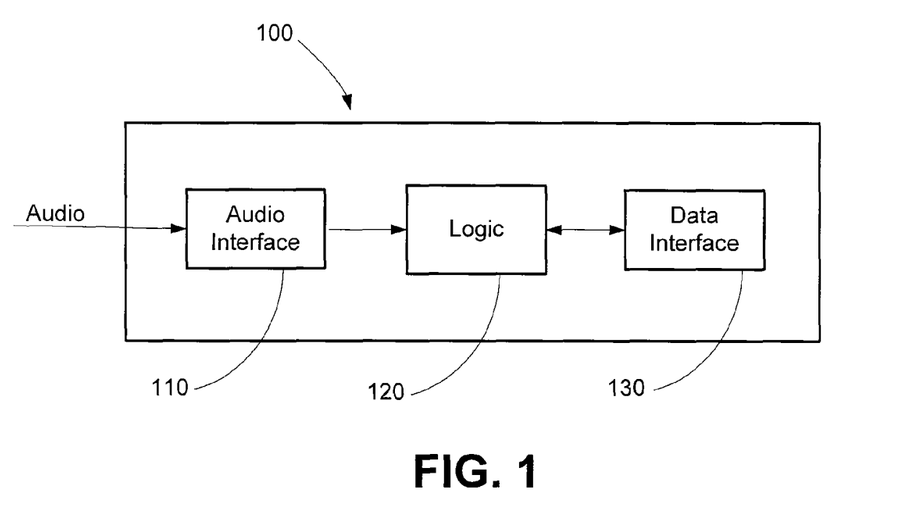
FIG. 1 is an example system for speech recognition using social networks.

Referring now to the drawings, FIG. 1 illustrates an example apparatus 100 for speech recognition using social networks configured in accordance with an example embodiment. Audio interface 110 is configured to receive an audio signal. Logic 120 is coupled to audio interface and, as will be explained in more detail herein is configured to extract data representative of a called party from an audio signal received by audio interface 110. "Logic", as used herein, includes but is not limited to hardware, firmware, and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable and/or programmed logic device, memory device containing instructions, or the like, or combinational logic embodied in hardware. Data interface 130 is coupled to logic 120 and to at least one social graph (not shown, see e.g., FIG. 4). Data interface 130 enables logic 120 to access data from the at least one social graph.

In an example embodiment, data interface 130 is configured to communicate with a social graph using an Application Programming Interface (API). Social Graphs can be internal or external. GOOGLE's Social Graph API is an example social graph data with an API for retrieving social graph data. Social networks that implement OpenSocial standard, including LINKEDIN and MYSPACE, also have API's for allowing third party connections. Facebook also has an API for enabling a third party to access a social graph within Facebook. In one example embodiment, data interface 130 forms a connection with a social graph using a markup language. XHTML FRIENDS NETWORK (XFN) and FRIEND OF A FRIEND (FOAF) are both examples of markup languages for describing a social graph.

Figure 2:
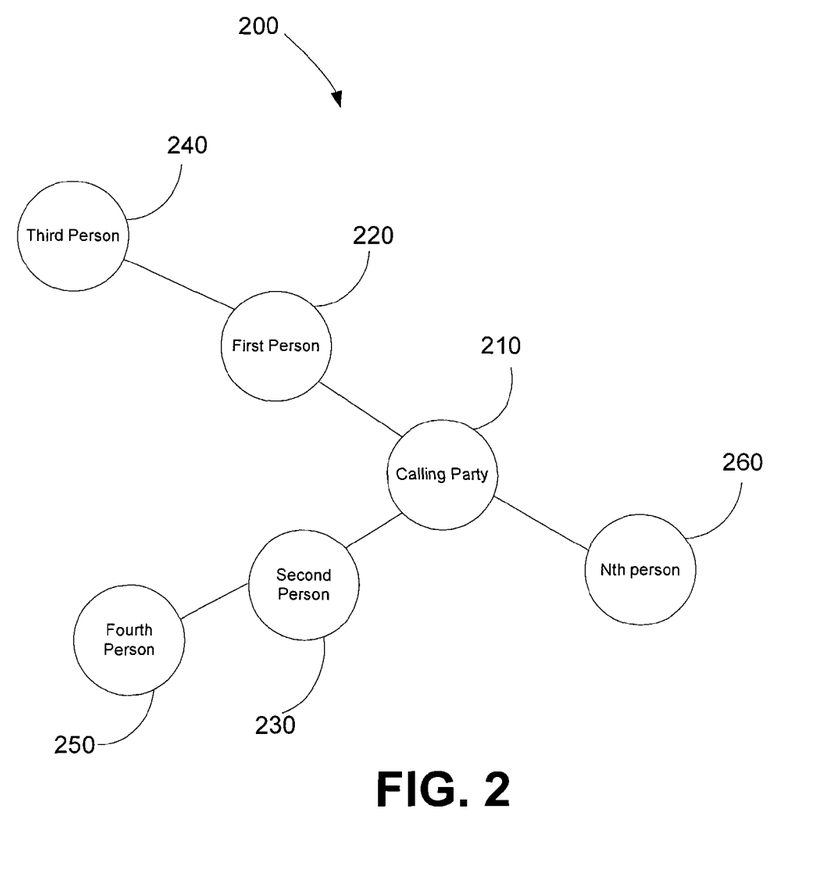
FIG. 2 illustrates an example social graph.

A social graph, as used herein, refers to a structure which defines relationships of individuals with one another. The structure comprises a plurality of data points, each data point representing an individual. Data points are interconnected within the structure according relationships between the individuals represented by the data points. FIG. 2 illustrates an example social graph 200. Data point 210 represents a calling party while data points 220, 230 and 260 represent first person, second person, and Nth person respectively, each having a direct relationship with the calling party. For example, John has a direct relationship with his father, Bill. Data points 240 and 250 represent third person and fourth person respectively, each having an indirect relationship with the calling party. For example, John has an indirect relationship with his father's boss, Mike. It shall be appreciated by those skilled in the art that a data point comprises suitable information for establishing relationships among individuals.

Figure 3:
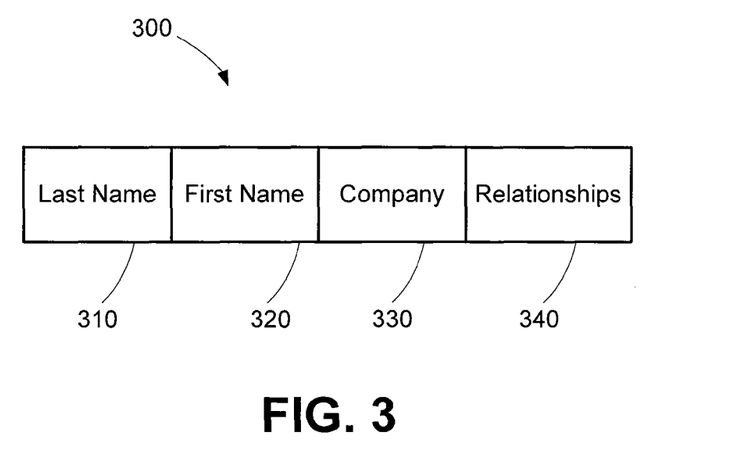
FIG. 3 illustrates an example data point stored in a social graph.

FIG. 3 illustrates an example data point 300 stored in a social graph. Data point 300 contains information representing an individual, including last name 310, first name 320, company 330, and relationships 340. For example, a data point may represent John Smith, employed by Company XYZ Corp, and having relationships with his boss, David Jones, and his father Mike Smith. Those skilled in the art shall appreciate that data point 300 may include additional information not shown. It shall be further appreciated by those skilled in the art that data point 300 may be stored on a node or at an edge of a social graph.

Social graphs are also known as social networks and may be public or private. GOOGLE's Social Graph is an example of a public social graph. It is freely available without any access restrictions. FACEBOOK is an example of a private social graph. User credentials may be required to access a private social graph. A corporate social graph for identifying relationships within a corporation is also a private social graph.

Logic 120 is configured to identify a calling party. by identifying the calling party, logic 120 can determine which social graphs to search. Those skilled in the art shall appreciate that the calling party may be identified using a suitable method. For example, the calling party's identification may be transmitted in combination with the audio signal. Alternatively, the calling party's identification may be transmitted during the call setup, prior to receiving the audio signal. In yet another example, the MAC address of a calling party's telephone may be used to identify the calling party if the telephone is associated with a specific user. The calling party may also be asked to provide identification via a user interface. In particular embodiments, the calling party may log in to the device to provide logic 120 with the calling party's identity. In yet another example embodiment, the calling party's identity may be pre-programmed.

To initiate a call, an audio signal containing data identifying the called party is received via audio interface 110. Logic 120 is configured to acquire data representative of a called party from the audio signal. For example, a calling party speaks "Call John Smith," intending to call John Smith. Logic 120 determines that the portion of the audio signal comprising "call" is not indicative of a called party and is therefore not included in the data representative of a called party. The spoken word "call" may be identified by logic 120 as extra speech. Extra speech may be any words spoken by the calling party in addition to the speech representative of the called party. Thus, acquired data representative of the called party comprises "John Smith". In one example embodiment, logic 120 is configured to distinguish speech indicative of a called party and extra speech. In another example, the calling party may speak "call my dad." Logic 120 determines "dad" to be a spoken relationship. Thus, acquired data representative of the called party comprises "dad" while "call my" is determined to be extra speech. In on example embodiment, logic 120 is configured to distinguish a spoken name from a spoken relationship. Not all social graphs, however, may refer to a relationship in the same way. For example, a first social graph may refer to a relationship as dad while a second social graph may refer to such a relationship as father. Thus, in one example embodiment, in acquiring the data representative of the called party, the data is converted to a form compatible with a social graph by logic 120. For example, in acquiring the data representative of the called party, "dad" is converted to "father."

Logic 120 is configured to initiate a search of the at least one social graph for the data representative of the called party to identify the called party responsive to acquiring the data representative of the called party. The search may be performed by logic 120, or logic 120 may send data to the at least one social graph and receive the results of a search performed by the at least one social graph. For example, if the data representative of a called party contains the text "John Smith," logic 120 is configured to have data points searched in a social graph having a relation to the called party and having a name John Smith. In one example embodiment, logic 120 is configured to initiate a search the data points having a direct relationship with the calling party. In one example embodiment, logic 120 is configured to initiate a search data points having both direct and indirect relationships with the calling party. It shall be appreciated by those skilled in the art that the extent to which a relationship is considered direct or indirect may be predefined. For example, a first calling party may consider his father's boss a direct relationship while a second calling party may consider his father's boss an indirect relationship. Similarly, a first calling party may consider his father's boss's brother an indirect relationship while a second calling party may not consider his father's boss's brother a relationship. In one example embodiment, logic 120 is configured to place a call to the called party.

By searching a social graph, called parties are identified more accurately when audio quality is poor or when speech is difficult to interpret. For example, a calling party may wish to speak to his boss John Smith. The calling party calls into his company's employee directory and speaks the name "John Smith" but because of his accent or because of poor audio quality, logic 120 only interprets the first name "John." There may be several employees at the calling party's company with a first name John. By searching the calling party's social graph however, logic 120 is able to determine that the calling party intended to call his boss John Smith and eliminate all other employees named John within different divisions of the company since they are not found in the calling party's social graph.

Logic 120 also identifies called parties more efficiently by eliminating duplicate names which are not part of the calling party's social graph. Referring back to the above example, there may be three John Smiths employed in different divisions at the company. However, logic 120 is able to determine that the calling party intended to call his boss the John Smith and eliminate all other employees named John Smith within different divisions of the company since they are not found in the calling party's social graph. Logic 120 also enables called parties to be identified by relationship in addition to name. Referring again to the same example, by examining relationships of a calling party's data point in a social graph, logic 120 is able to determine that the calling party intended to call his boss John Smith when the calling party speaks "boss."

Figure 4:
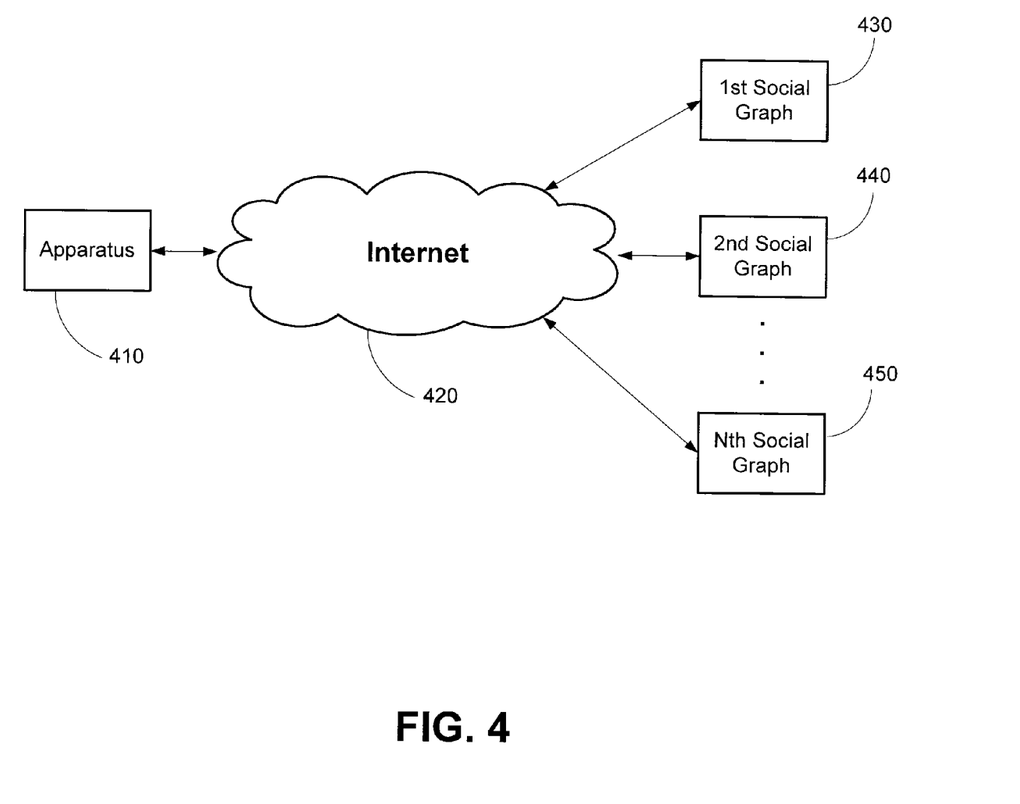
FIG. 4 illustrates an example system in communication with a plurality of social graphs.

In one example embodiment, data interface 130 is configured to communicate with a plurality of social graphs (see e.g., FIG. 4 described herein). Thus, in one example, logic 120 is configured to access a database to select a social graph from the plurality of social graphs to search for the data representative of the called party to identify the called party. For example, a database maps a calling party to an associated social graph. Thus, using the database, a social graph may be selected based on a calling party identification. In one example embodiment, logic 120 is configured to use one of the group consisting of the calling party's phone number and credentials supplied by the calling party to select a social graph from a plurality of social graphs to search for the data representative of the called party to identify the called party. For example, when prompted, a calling party may provide his user identification as well as a name of a social graph. Logic 120 then searches the social graph using the calling party's provided identification.

In one example embodiment, logic 120 is configured to search a plurality of social graphs for the data representative of the called party to identify the called party. For example, logic 120 may search a calling party's personal social graph and a calling party's professional social graph. In one example embodiment, logic 120 is configured to search at least on social graph in accordance with a predetermined priority. For example, logic 120 may be configured to search a calling party's personal social graph before searching the calling party's professional social graph. In one example embodiment, logic 120 is configured to search one of the plurality of social graphs in accordance with a time of day. For example, logic 120 may be configured to search a professional social graph during the hours of 8:00 A.M. and 5 P.M. and be configured to search a personal social graph during all other hours of the day. This may help distinguish a business contact from a non-business contact within the calling party's social graph. For example, a calling party may have a relationship with two contacts having identical names, one being a business client and one being a family member. Logic 120 selects a social graph including the calling party's business client during business hours but selects a social graph including the calling party's family member during non-business hours. It shall be appreciated by those skilled in the art that the plurality of social graphs may be searched in accordance with other suitable configurations.

Figure 8:
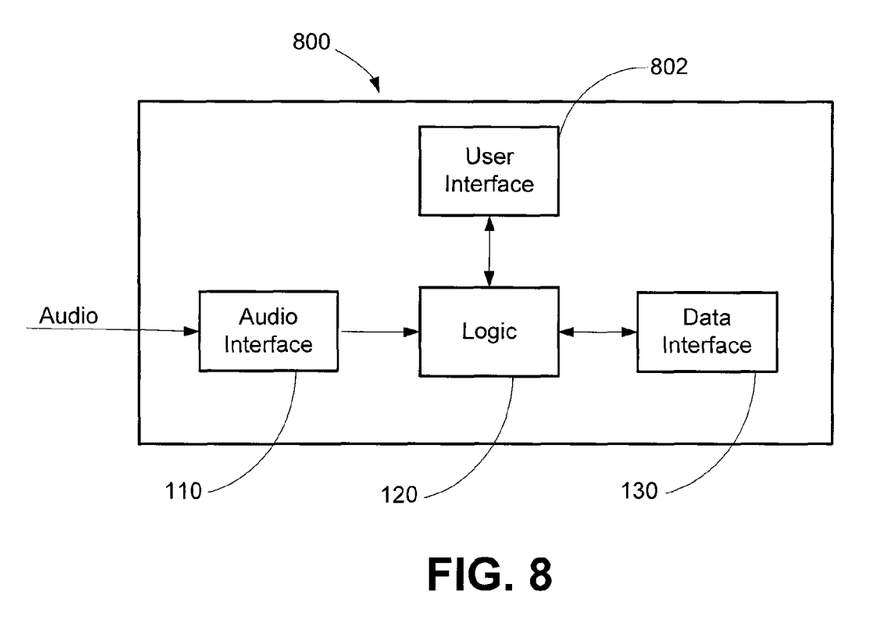
FIG. 8 is an example system for speech recognition using social networks that includes a user interface.

Referring to FIG. 8, with continue reference to FIG. 1, there is illustrated an example embodiment of an apparatus 800 comprising a user interface 802 coupled to logic 120. Logic 120 is further configured to search the at least one social graph for the data representative of the called party to identify a plurality of parties. User interface 802 is configured to present the plurality of parties for selecting the called party and to receive a selection of the called party.

User interface 802 may be suitably any audio, visual, or touch interface. For example, user interface 802 may employ an audio interface to output the search results, and wait for an audio (such as a voice command), visual (for example a pointing device) or touch (such as a key press or contact with a point on a touchscreen) to indicate the selection. As another example, user interface 802 may output the results visually, such as on a display device like a Liquid Crystal Display (LCD) and wait for an audio, visual or touch to indicate the selection.

FIG. 4 illustrates an example apparatus 410 for speech recognition coupled to a plurality of social networks in communication with a plurality of social graphs. Apparatus 410 may be configured as illustrated by apparatus 100 (FIG. 1). Apparatus 410 is in communication with first social graph 430, second social graph 440, and Nth social graph 450 via Internet 420. Social graphs 430, 440, and 450 may be public or private social graphs. It shall be appreciated by those skilled in the art that communications with first social graph 430, second social graph 440, and Nth social graph 450 may be formed using an API, a markup language, or other suitable means. It shall be further appreciated by those skilled in the art that the communication formed between apparatus 410 and social graphs 430, 440, and 450 may be wired, wireless, or a combination of both.

For example, apparatus 410 may suitably comprise a database mapping for calling parties to social graphs. When apparatus 410 receives an audio signal to initiate a call, e.g. "Call John Smith," it can use the database to determine which of social graphs 430, 440 and 450 to search based on who is the calling party. For example, social graph 430 may be searched, social graph 440 may be searched, social graph 450 may be searched, or any combination of social graphs 430, 440, 450 may be searched based on the mapping of calling party to social graphs. This can eliminate needless searching of social graphs that are not associated with the calling party.

In an example embodiment, searching of social graphs 430, 440, 450 may be prioritized. For example, if there are multiple matches on multiple social graphs (for example social graphs 430 and 44), the results may be presented in a prioritized list by social graph. In addition, the priority of a social graph may be dynamic. For example social graph 430 may be given priority over social graph 440 during work hours and/or when the user is at the office; otherwise, social graph 440 has priority over social graph 430.

Figure 5:
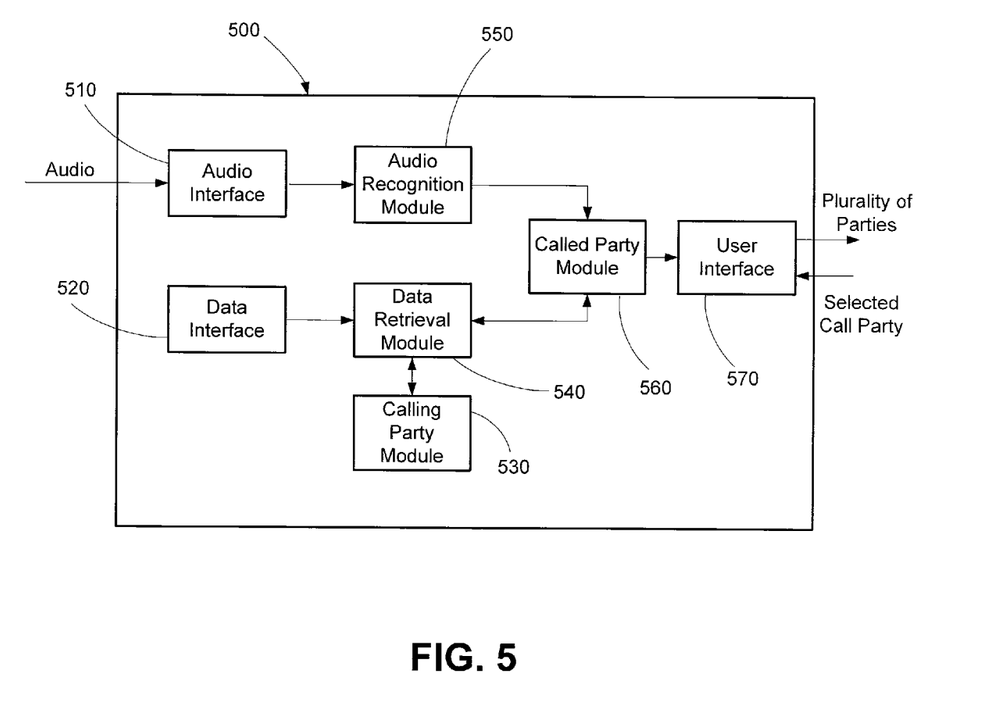
FIG. 5 is an example system for speech recognition using social networks.

FIG. 5 illustrates an example apparatus 500 for speech recognition using social networks configured in accordance with an example embodiment. Audio interface 510 is configured to receive an audio signal. Data interface 520 is configured to communicate with at least one social graph. In one example, data interface 520 employs an Application Programming Interface to retrieve a calling party's relationships from a social graph. In another example, data interface 520 employs a markup language to retrieve a calling party's relationships from a social graph. Calling party module 530 is configured to identify a calling party. Those skilled in the art shall appreciate that the calling party may be identified using a suitable method. For example, the calling party's identification may be transmitted either as part of the audio signal or during a call setup, prior to receiving the audio signal. In another example, the MAC address of a calling party's telephone may be used to identify the calling party if the telephone is associated with a specific user. The calling party may also be asked to provide identification via a user interface.

Data retrieval module 540 is coupled to the calling party module 530 and the data interface 520. Data retrieval module 540 is configured to receive the calling party's identification from calling party module 530 and to select at least one social graph associated with the identified calling party via data interface 520. In one example embodiment, data retrieval module 540 is configured to access a database (not shown) to select a social graph associated with the identified calling party. The database maps the calling party to at least one social graph. Data retrieval module 540 uses the calling party's identification to select one or more social graphs mapped to the calling party in the database. Data retrieval module 540 communicates with the selected social graphs using data interface 520. In one example embodiment data retrieval module 540 is configured to map the calling party to a social graph based on the calling party's phone number. For example, a social network may store phone numbers of all associated users. Data retrieval module 540 may query a social network, via data interface 520, using a phone number to determine if the calling party is associated with the social network.

Data retrieval module 540 may query a predetermined number of social networks in a predetermined order. If data retrieval module 540 determines that a plurality of social networks are associated with the calling party, data retrieval module 540 may search the plurality of social graphs in a predetermined order. Alternatively, data retrieval module 540 may be configured to search the plurality of social graphs according to a defined rule or algorithm. For example, data retrieval module 540 may be configured to search one of the plurality of social graphs in accordance with the time of day. Alternatively, data retrieval module 540 may be configured to search one of the plurality of social graphs in accordance with a calling party's favorite or most recently used social network. In one example embodiment, data retrieval module 540 is configured to map a calling party to a social graph based on credentials supplied by the calling party. For example, a calling party may provide the name of a social graph as well as a user ID and password for accessing the calling party's relationships in the social graph.

Audio recognition module 550 is coupled to audio interface 510 and configured to acquire data representative of a called party from the audio interface. Audio recognition module 550 converts the audio signal into a data format suitable for searching in a social graph. For example, audio recognition module may produce a text data string corresponding to the audio signal received by audio interface 510. In one example, a text data string corresponding to the audio signal may not be compatible with a social graph. Therefore, in one example, audio recognition module 550 is configured to translate a spoken relationship to a suitable form. For example, a calling party may speak "call pappa" with the intention to call his father. However, a social graph may only recognize "father" or "dad" as a relationship. Thus, audio recognition device 550 may translate "pappa" to "dad."

Called party module 560 is coupled to data retrieval module 540 and audio recognition module 550. Called party module 560 is configured to identify the called party by searching the at least one social graph for the data representative of the called party. Called party module 560 searches the at least one social graph identified by data retrieval module 540 for the data representative of the called party generated by audio recognition module 550. In one example, calling party module 560 searches a social graph for a calling party's relationship. For example, called party module 560 may search for a calling party's father, best friend, or boss. In another example, called party module 560 searches for a specific called party name. For example, called party module 560 may search for "John Jones."

User interface 570 is coupled to called party module 560. If called party module 560 identifies a plurality of parties, user interface 570 is configured to present the identified plurality of parties to the calling party for selecting the called party. User interface 570 is configured to receive a selection of the called party from the identified plurality of parties. For example, a calling party may speak "John Smith" but because of poor audio quality, audio recognition module 550 is only able to interpret "John." Called party module 560 identifies two possible called parties, John Smith and John Jones, both of which are in the calling party's social graph. User Interface 570 presents both parties to the calling party for selecting the intended called party. User interface 570 may present the identified plurality of parties to the calling party visually, audibly, or in other suitable means. For example, user interface 570 may display a list of parties to the calling party. In another example, user interface 570 may play an audio recording comprising the names of the plurality of parties. Similarly, user interface 570 may receive, from the calling party, the selection in the form of speech, text, or other suitable means. Thus, even though a calling party is required to identify a called party from a list of potential parties, using a social graph to generate the list results in a less confusing list since parties not having a relationship with the calling party are not included in the list.

Figure 6:
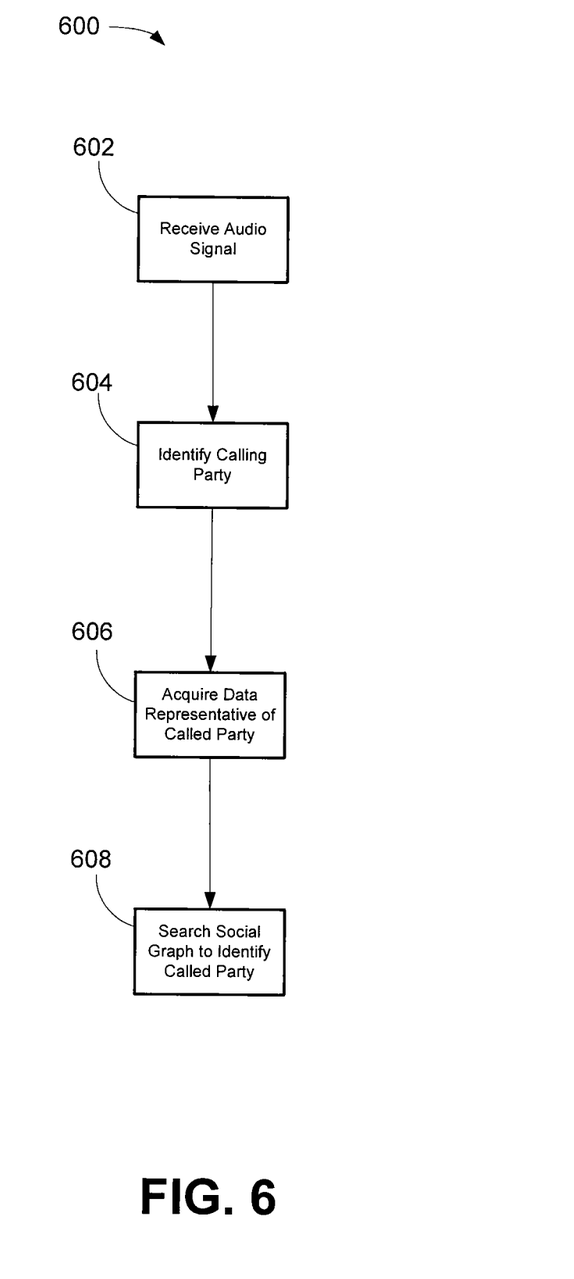
FIG. 6 is a block diagram of a methodology for speech recognition using social networks in accordance with an example embodiment.
Figure 7:
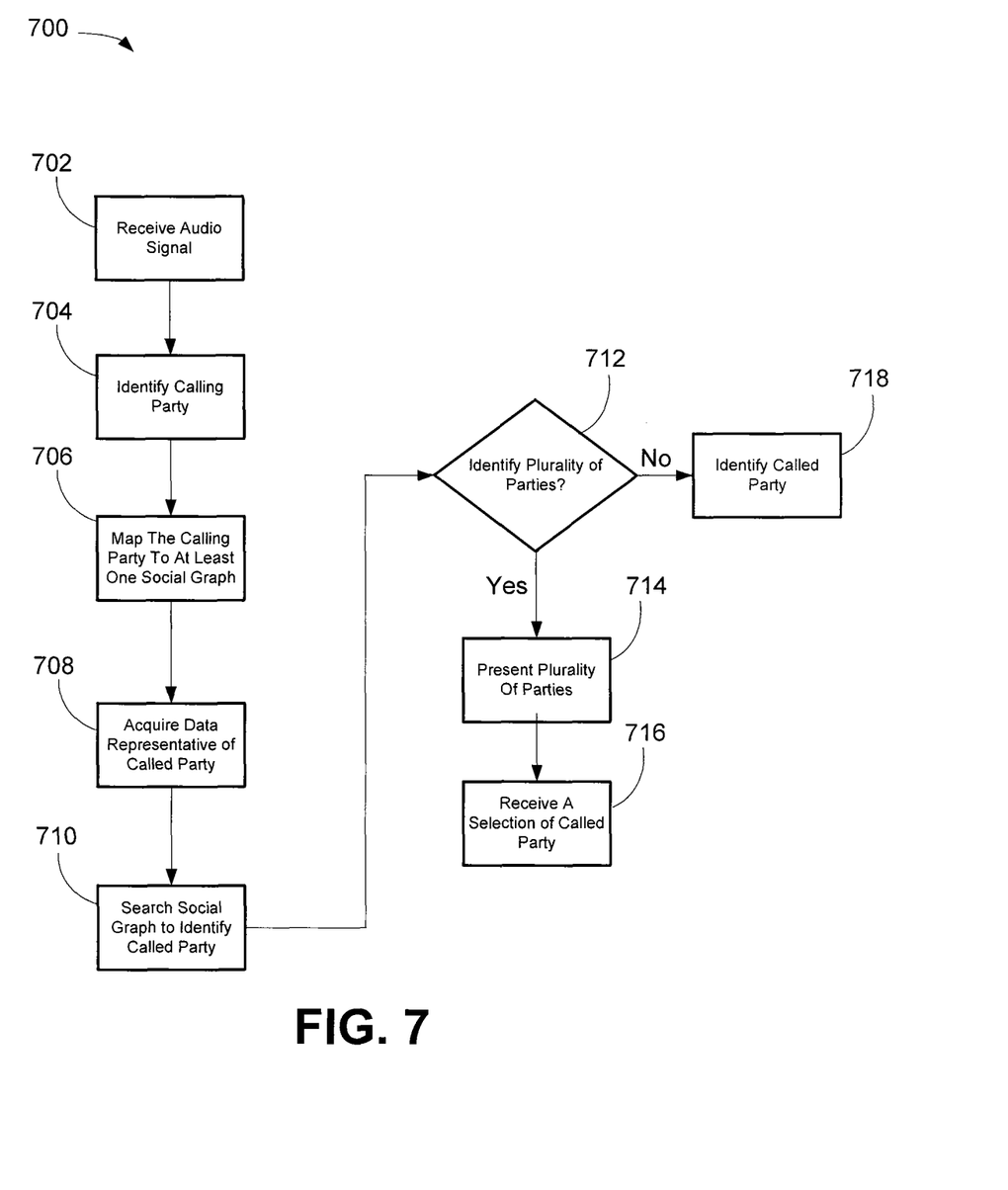
FIG. 7 is a block diagram of a methodology for speech recognition using social networks in accordance with an example embodiment.

In view of the foregoing structural and functional features described above, a methodology in accordance with an example embodiment will be better appreciated with reference to FIGS. 6-7. While, for purposes of simplicity of explanation, the methodology of FIGS. 6-7. is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. The methodology described herein are suitably adapted to be implemented in hardware, a software controlled microprocessor, or a combination thereof.

FIG. 6 illustrates a block diagram of a methodology 600 for speech recognition using social networks in accordance with an example embodiment. At 602, an audio signal is received. In an example embodiment, the audio signal is a name of a called party spoken by a calling party. In an example embodiment, the audio signal is a relationship spoken by a calling party. In one example embodiment, the audio signal is received in analog form. In one example embodiment, the audio signal is in digital form.

At 604, a calling party is identified. Those skilled in the art shall appreciate that the calling party may be identified using a suitable method. For example, the calling party's identification may be transmitted in combination with the audio signal. Alternatively, the calling party's identification may be transmitted during the call setup, prior to receiving the audio signal. In yet another example, the MAC address of a calling party's telephone may be used to identify the calling party if the telephone is associated with a specific user. The calling party may also be asked to provide identification via a user interface.

At 606, data representative of a called party is acquired from the audio signal. For example, a calling party speaks "Call John Smith," intending to call John Smith. The portion of the audio signal comprising "call" is determined not to be indicative of a called party and is therefore not included in the data representative of a called party. The spoken word "call" may be identified as extra speech. Extra speech may be any words spoken by the calling party in addition to the speech representative of the called party. Thus, acquired data representative of the called party comprises "John Smith". In one example embodiment, speech indicative of a called party is distinguished from extra speech. In another example, the calling party may speak "call my dad." Dad is determined to be a spoken relationship. Thus, acquired data representative of the called party comprises "dad" while "call my" is determined to be extra speech. However, not all social graphs may refer to a relationship as dad. Some social graphs may only refer to such a relationship as father. Thus, in one example embodiment, in acquiring the data representative of the called party, the data is converted to a form compatible with a social graph. For example, in acquiring the data representative of the called party, "dad" is converted to "father."

At step 608, the at least one social graph is searched for the data representative of the called party to identify the called party responsive to acquiring the data representative of the called party. In one example embodiment, only data points having a direct relationship with the calling party are searched in the social graph. In one example embodiment, data points having both direct and indirect relationships with the calling party are searched in the social graph. In one example embodiment, a call is placed to the called party. Communication with the at least one social graph is established using suitable means. In an example embodiment, communication with the at least one social graph is established using an Application Programming Interface (API). In one example embodiment, communication with the at least one social graph is established using a markup language.

In one example embodiment, communication is established with a plurality of social graphs. Thus, in one example embodiment, a database maps the calling party to a social graph. The database is accessed to select a social graph from the plurality of social graphs to search for the data representative of the called party to identify the called part. In one example embodiment, one of the group consisting of the calling party's phone number and credentials supplied by the calling party is used to select a social graph from a plurality of social graphs to search for the data representative of the called party to identify the called party.

In one example embodiment, a plurality of social graphs are searched for the data representative of the called party to identify the called party. For example, a calling party's personal social graph and a calling party's professional social graph may be searched. In one example embodiment, at least one social graph is searched in accordance with a predetermined priority. For example, a calling party's personal social graph is searched before the calling party's professional social graph is searched. In one example embodiment, one of the plurality of social graphs is searched in accordance with a time of day. For example, a professional social graph is searched during the hours of 8:00 A.M. and 5 P.M. but a personal social graph is searched during all other hours of the day. This helps distinguish a business contact from a non-business contact within the calling party's social graph. For example, a calling party has a relationship with two contacts having identical names, one being a business client and one being a family member. Thus, the calling party's business client may be identified during business hours and the calling party's family member is identified during non-business hours. It shall be appreciated by those skilled in the art that the plurality of social graphs may be searched in accordance with other suitable configurations.

FIG. 7 illustrates a block diagram of a methodology 700 for speech recognition using social networks in accordance with an example embodiment. At 702, an audio signal is received from a calling party. The audio comprises data indicative of a called party. In an example embodiment, the received audio is a name of a called party spoken by the calling party. In an example embodiment, the received audio is a relationship spoken by the calling party. At 704, the calling party is identified. Those skilled in the art shall appreciate that the calling party may be identified using any suitable method, such as the methods described herein.

At 706, the calling party is mapped to at least one social graph using the calling party's identification. In an example embodiment, the calling party is mapped to a social graph by accessing a database. In an example embodiment, the calling party is mapped to a social graph using either the calling party's phone number or credentials supplied by the calling party. In an example embodiment, the calling party is mapped to a plurality of social graphs associated with the calling party. In an example embodiment, at least one of the plurality of social graphs is searched in accordance with a predetermined priority.

At 708, data representative of the called party is acquired from the audio signal. In one example embodiment, speech indicative of a called party is distinguished from extra speech. For example, the spoken audio "please call john smith" comprises the extra speech "please call." Extra speech is not indicative of a called party. Thus, in acquiring data indicative of a called party, extra speech is removed. In one example embodiment, a spoken party's name is distinguished from a spoken relationship. For example, "father" is interpreted to be a relationship while "James" is interpreted to be a name.

At 710, at least one social graph is searched for the data representative of the called party to identify the called party. In one example embodiment, searching for a party name is distinguished from searching for a relationship. For example, if the data acquired representative of a called party is a relationship, searching a social graph will constitute searching relationships field 340 of a data point for a match. However, if data acquired representative of a called party is a name, searching a social graph will constitute searching last name field 310 and first name field 320 of a data point for a match. It shall be appreciated by those skilled in the art that a search may be performed using a suitable method. For example, GOOGLE's SOCIAL GRAPH API may be queried by making an HTTP request to a specially formatted URL.

At 712, it is determined whether a plurality of parties are identified. If, at 712, it is determined that a plurality of parties are identified, and at 714, the plurality of parties are presented to the calling party for selecting a called party. At 716, a selection of a called party from the plurality of parties is received from the calling party. It shall be appreciated by those skilled in the art that presenting and receiving information may be done visually, audibly, or using other suitable means. If, at 712, it is determined that a single party is identified, then at 718, a called party is identified.

In an example embedment, once the called party is identified, communications are established between the called party and the calling party. Although the above description describes the use of social networks in the context of making telephone calls, those skilled in the art should readily appreciate the principles of the example embodiments described herein are also applicable to other types of communications. For example, the principles described herein may also be employed in text messages such as Simple Messaging System (SMS) text messages, Instant Messages (IM) and/or electronic mail (email) messages. In these embodiments, the calling party would be the sender and the receiver would be the called party.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
an audio input configured to receive an audio signal representative of a voice input of an associated calling party;
the audio input further configured to generate audio data corresponding to the received audio signal;
a data interface configured to communicate with one or more associated social graphs, in accordance with an Application Programming Interface (API) corresponding thereto, via an associated internetworking system; and
logic coupled with the audio input and the data interface;
wherein the logic is configured to identify the calling party and a plurality of social graphs associated with the calling party;
wherein the logic is configured to acquire data representative of a called party from the audio data, the data representative of the called party indicating a relationship between the calling party and the called party;
wherein the logic converts the data indicating the relationship between the calling party and called party to a form that is compatible with one or more of the plurality of social graphs;
wherein the logic initiates a session with the plurality of social graphs in accordance with an identity of the calling party;
wherein the logic is configured to initiate, in accordance with a predetermined priority, a prioritized search of the plurality of social graphs associated with the calling party for the data representative of the called party to identify the called party responsive to acquiring the data representative of the called party, wherein the predetermined priority comprises one or more of a time of day, a social characteristic of social graphs of the plurality of social graphs, a business characteristic of social graphs of the plurality of social graphs, a favorite preference of the associated calling party, or a frequency of use by the associated calling party of social graphs of the plurality of social graphs.

2. The apparatus set forth in claim 1, wherein the logic is further configured to place a call to the called party.

3. The apparatus set forth in claim 1, wherein the audio data comprises data representative of one of a group consisting of a name and a relationship.

4. The apparatus set forth in claim 1, wherein the logic is configured to employ one of the group consisting of the Application Programming Interface and a markup language to retrieve the data representative of the called party indicating the relationship between the calling and the called party.

5. The apparatus set forth in claim 1, further comprising a user interface coupled with the logic;
wherein the logic is further configured to identify a plurality of parties; and
wherein the user interface is configured to:
present the plurality of parties for selecting the called party; and
receive a selection of the called party.

6. The apparatus set forth in claim 1, wherein the logic is further configured to access a database to select a social graph from the plurality of social graphs to search for the data representative of the called party to identify the called party.

7. The apparatus set forth in claim 1, wherein the logic is further configured to use one of the group consisting of the calling party's phone number and credentials supplied by the calling party to select a social graph from the plurality of social graphs to search for the data representative of the called party to identify the called party.

8. The apparatus set forth in claim 1, wherein the logic is further configured to search the plurality of social graphs for the data representative of the called party to identify the called party responsive to acquiring the data representative of the called party.

9. A method comprising:
receiving an audio signal representative of a voice input of an associated calling party;
generating audio data corresponding to the received audio signal;
identifying the associated calling party and a plurality of associated social graphs associated with the calling party;
acquiring data representative of a called party from the audio data;

searching, by a processor, for the called party;

obtaining, by the processor, a plurality of matches for the called party;

initiating a session with the plurality of associated social graphs in accordance with one or more Application Programming Interfaces (APIs) associated with the plurality of social graphs and the identity of the calling party via an associated internetworking system;

searching by the processor, in accordance with a predetermined priority, the plurality of social graphs for the data representative of the called party responsive to acquiring the data representative of the called party and obtaining a plurality of matches for the called party, wherein the predetermined priority comprises one or more of a time of day, a social characteristic of the plurality of social graphs, a business characteristic of the plurality of social graphs, a preference of the associated calling party, or a frequency of use by the associated calling party of social graphs of the plurality of social graphs; and eliminating, by the processor, a called party from the plurality of matches for the called party that are not found in the at least one social graph.

10. The method set forth in claim 9, further comprising placing a call to the called party.

11. The method set forth in claim 9, wherein the audio data comprises one of the group consisting of a name and a relationship.

12. The method set forth in claim 9, further comprising retrieving the calling party's relationships from the at least one social graph by employing one of the group consisting of an Application Programming Interface and a markup language.

13. The method set forth in claim 9, further comprising:
identifying a plurality of parties;
presenting the plurality of parties for selecting the called party; and
receiving a selection of the called party.

14. The method set forth in claim 9, further comprising accessing a database to select a social graph from a plurality of social graphs to search for the data representative of the called party to identify the called party.

15. The method set forth in claim 9, further comprising using one of the group consisting of the calling party's phone number and credentials supplied by the calling party to select a social graph from the plurality of social graphs to search for the data representative of the called party to identify the called party.

16. The method set forth in claim 9, wherein the data representative of the called party is data indicating a relationship between the calling party and the called party, and further comprising:
searching the plurality of social graphs for the data representative of the called party to identify the called party responsive to acquiring the data representative of the called party.

17. An apparatus comprising:
an audio input configured to receive an audio signal representative of a voice input of a calling party;
an audio data generator configured to generate audio data from the received audio signal;
a data interface configured to communicate with a plurality of associated social graphs in accordance with an Application Programming Interface (API) associated therewith;
a calling party module configured to determine an identity of the calling party;
a data retrieval module coupled with the calling party module and the data interface, the data retrieval module being configured to select a set of associated social graphs to be searched from the plurality of associated social graphs associated with the identified calling party;
an audio recognition module coupled with the audio input, the audio recognition module being configured to acquire data representative of a called party from the audio data;
a session module coupled with the data retrieval module, the session module being configured to initiate a session with the selected set of social graphs in accordance with the identity of the calling party via an associated internetworking system; and
a called party module, coupled with the data retrieval module and the audio recognition module, the called party module being configured to identify the called party by searching in accordance, with a predetermined priority, the selected set of social graphs for the data representative of the called party, wherein the predetermined priority comprises one or more of a time of day, a social characteristic of graphs of the plurality of social graphs, a business characteristic of graphs of the plurality of social graphs, a preference of the associated calling party, or a frequency of use by the associated calling party of graphs of the plurality of social graphs.

18. The apparatus set forth in claim 17, wherein the audio data comprises data representative of one of the group consisting of a name and a relationship.

* * * * *